United States Patent
Kim

(10) Patent No.: US 10,125,857 B2
(45) Date of Patent: Nov. 13, 2018

(54) TRANSMISSION MOUNT FOR VEHICLE HAVING DISTRIBUTED STOPPERS

(71) Applicants: Hyundai Motor Company, Seoul (KR); Kia Motors Corporation, Seoul (KR)

(72) Inventor: Yong-Joo Kim, Hwaseong-si (KR)

(73) Assignees: Hyndai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/646,666

(22) Filed: Jul. 11, 2017

(65) Prior Publication Data

US 2018/0163842 A1  Jun. 14, 2018

(30) Foreign Application Priority Data

Dec. 13, 2016 (KR) .................. 10-2016-0169469

(51) Int. Cl.
*F16H 57/025* (2012.01)
*F16H 57/028* (2012.01)
(Continued)

(52) U.S. Cl.
CPC ......... *F16H 57/028* (2013.01); *F16H 57/025* (2013.01); *F16F 3/087* (2013.01); *F16F 3/093* (2013.01)

(58) Field of Classification Search
CPC .... F16H 57/028; F16H 57/025; F16H 57/023; B60K 5/12; B60K 5/1208; F16F 3/087;
(Continued)

(56) References Cited

U.S. PATENT DOCUMENTS 5,295,653 A * 3/1994 Miyazaki ............... B21D 53/00
248/121
5,788,207 A * 8/1998 Bunker .................. B60K 17/00
248/634
(Continued)

FOREIGN PATENT DOCUMENTS

JP 3893977 B2 12/2006
JP 4135719 B2 6/2008
(Continued)

*Primary Examiner* — Nkeisha Smith
(74) *Attorney, Agent, or Firm* — Morgan, Lewis & Bockius LLP

(57) ABSTRACT

A transmission mount for a vehicle may include a bracket which accommodates an insulator having an external core coupled with an internal core, and includes an upper housing that covers an upper portion of the insulator, and a plate that supports a lower portion of the insulator; and the external core which includes, based on the inserted internal core, a lower portion, an upper portion, both lateral portions, both bridge portions that support a body of the external core, and a lower main stopper formed on an upper surface of the plate, in which a space portion is formed in a body of the external core wherein a strut, which protrudes from a rear surface of an upper housing of the bracket, is inserted into the space portion, and internal wall surfaces of the space portion come into contact with an upper portion, a lower portion, and a front portion of the strut, respectively.

5 Claims, 8 Drawing Sheets

(51) Int. Cl.
*F16F 3/093* (2006.01)
*F16F 3/087* (2006.01)

(58) Field of Classification Search
CPC ...... F16F 3/0873; F16F 3/1371; F16F 3/1376; F16F 3/093; F16F 3/10; F16F 3/12; F16F 3/00
USPC .................................................. 248/634, 636
See application file for complete search history.

(56) References Cited

U.S. PATENT DOCUMENTS

| | | | | |
|---|---|---|---|---|
| 5,975,509 | A * | 11/1999 | Miyamoto | F16F 13/1418 248/636 |
| 6,213,455 | B1 * | 4/2001 | Kato | F16F 1/38 267/140.12 |
| 6,419,215 | B1 * | 7/2002 | Johnson | B60G 7/02 267/140.12 |
| 6,651,966 | B2 * | 11/2003 | Hettler | F16F 1/3863 248/634 |
| 9,739,333 | B2 * | 8/2017 | Michiyama | F16F 13/103 |
| 9,771,996 | B2 * | 9/2017 | Ishikawa | F16F 3/0873 |
| 9,796,255 | B2 * | 10/2017 | Inatomi | F16F 1/3849 |
| 2012/0267184 | A1 * | 10/2012 | Joly | F16F 1/373 180/291 |
| 2013/0153741 | A1 * | 6/2013 | Pichel | F16F 1/3849 248/634 |
| 2015/0240901 | A1 * | 8/2015 | Ishikawa | F16F 1/38 248/634 |
| 2015/0345583 | A1 * | 12/2015 | Ishikawa | F16F 3/0873 248/634 |
| 2016/0053848 | A1 * | 2/2016 | Nakamura | F16F 1/3842 248/634 |
| 2016/0238102 | A1 * | 8/2016 | Goto | B60K 5/1208 |
| 2016/0305505 | A1 * | 10/2016 | Kadowaki | B60K 5/1216 |
| 2016/0341275 | A1 * | 11/2016 | Kaneko | F16F 15/08 |
| 2017/0211648 | A1 * | 7/2017 | Kadowaki | F16F 1/387 |
| 2017/0299013 | A1 * | 10/2017 | Kojima | F16F 15/08 |

FOREIGN PATENT DOCUMENTS

| | | |
|---|---|---|
| JP | 2012-116242 A | 6/2012 |
| JP | 5641524 B2 | 11/2014 |

* cited by examiner (PRIOR ART)

TRANSMISSION MOUNT FOR VEHICLE HAVING DISTRIBUTED STOPPERS

CROSS-REFERENCE(S) TO RELATED APPLICATIONS

The present application claims priority to Korean Patent Application No. 10-2016-0169469, filed on Dec. 13, 2016, the entire contents of which is incorporated herein for all purposes by this reference.

BACKGROUND OF THE INVENTION

Field of the Invention

The present invention relates to a transmission mount for a vehicle, and more particularly, to a transmission mount for a vehicle which includes a bracket which accommodates an insulator having an external core coupled with an internal core, and includes an upper housing that covers an upper portion of the insulator, and a plate that supports a lower portion of the insulator; and the external core which includes, based on the inserted internal core, a lower portion, an upper portion, both lateral portions, both bridge portions that support a body of the external core, and a lower main stopper formed on an upper surface of the plate, in which a space portion is formed in the body of the external core so that a strut, which protrudes from a rear surface of an upper housing of the bracket, is inserted into the space portion, and internal wall surfaces of the space portion come into contact with an upper portion, a lower portion, and a front portion of the strut, respectively.

Description of Related Art

In general, a transmission mount refers to a component that is configured to connect a power train and a vehicle body, support the load of the power train, control displacement, and prevent vibrations and noise of the power train from being transmitted to the vehicle body.

FIG. 1 and FIG. 2 are configuration views of a transmission mount in the related art, and an insulator 20 having an external core 22 to which an internal core 21 is coupled is accommodated in a bracket 10 having mounting arms 11, 12, and 13 formed in respective directions.

In the present case, the external core 22, which supports the internal core 21 of the insulator 20, includes a lower portion 22a, an upper portion 22b, and both lateral portions 22c and 22d, and the lower portion 22a attenuates omnidirectional vibrations while contacting with a lower stopper 31, an upper stopper 32, a first side stopper 33, and a second side stopper 34 formed in a housing of the insulator.

However, previous transmission mounts had been developed mainly for the function of attenuating vibrations, but recently design of a stopper structure for ride quality and handling (riding and handling, R&H) performance is considered more important.

Meanwhile, technologies for improving a stopper function of the transmission mount are disclosed in Japanese Patent Application Laid-Open Nos. 2012-116242, 2006-177544, and 2012-202418, U.S. Patent Application Publication No. 2016-238102, and Japanese Patent Application Laid-Open No. 2003-202053, but the technologies have a limitation in implementing R&H performance to a sufficient extent.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a configuration of a transmission mount configured for performing the operation of an auxiliary stopper in respective directions as well as the operation of a main stopper in the respective directions with respect to vibrations transmitted in up and down directions, front and rear directions, and left and right directions.

Various aspects of the present invention are directed to providing a transmission mount for a vehicle, including a bracket which accommodates an insulator having an external core coupled with an internal core, and includes an upper housing that covers an upper portion of the insulator, and a plate that supports a lower portion of the insulator; and the external core which includes, based on the inserted internal core, a lower portion, an upper portion, both lateral portions, both bridge portions that support a body of the external core, and a lower main stopper formed on an upper surface of the plate, in which a space portion is formed in a body of the external core wherein a strut, which protrudes from a rear surface of an upper housing of the bracket, is configured to be inserted into the space portion, and internal wall surfaces of the space portion contact with an upper portion, a lower portion, and a front portion of the strut, respectively.

The transmission mount of the present invention, which has the configurations, is a very advanced invention in that the auxiliary stopper as well as the main stopper are operated in the respective directions with respect to vibration transmitted in the up and down directions, the front and rear directions, and the left and right directions, wherein the distributed stoppers may be operated in the respective directions, and as a result, it is possible to further improve noise, vibration, and hardness (NVH) performance of the vehicle, and to improve R&H performance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 and FIG. 5 are cross-sectional views of the transmission mount according to an exemplary embodiment of the present invention, in which FIG. 4 is a cross-sectional view taken along line A-A' in FIG. 3, and FIG. 5 is a cross-sectional view taken along line B-B' in FIG. 4.

Figure 1:
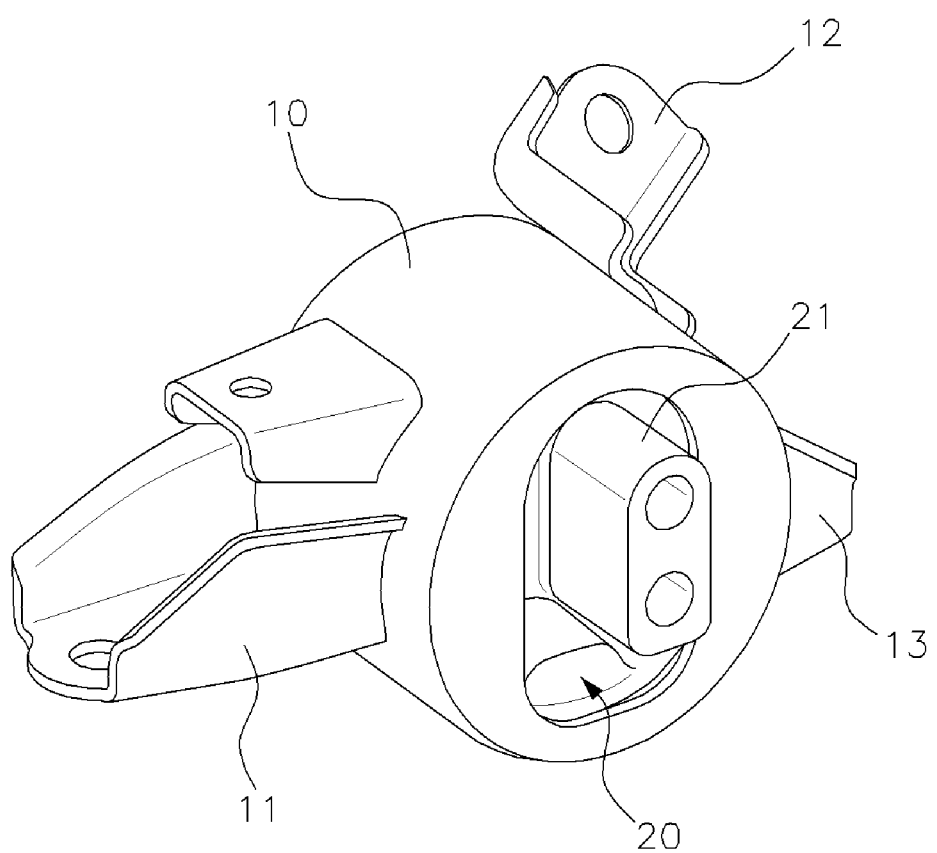
FIG. 1 is a perspective view of a transmission mount in the related art.
Figure 2:
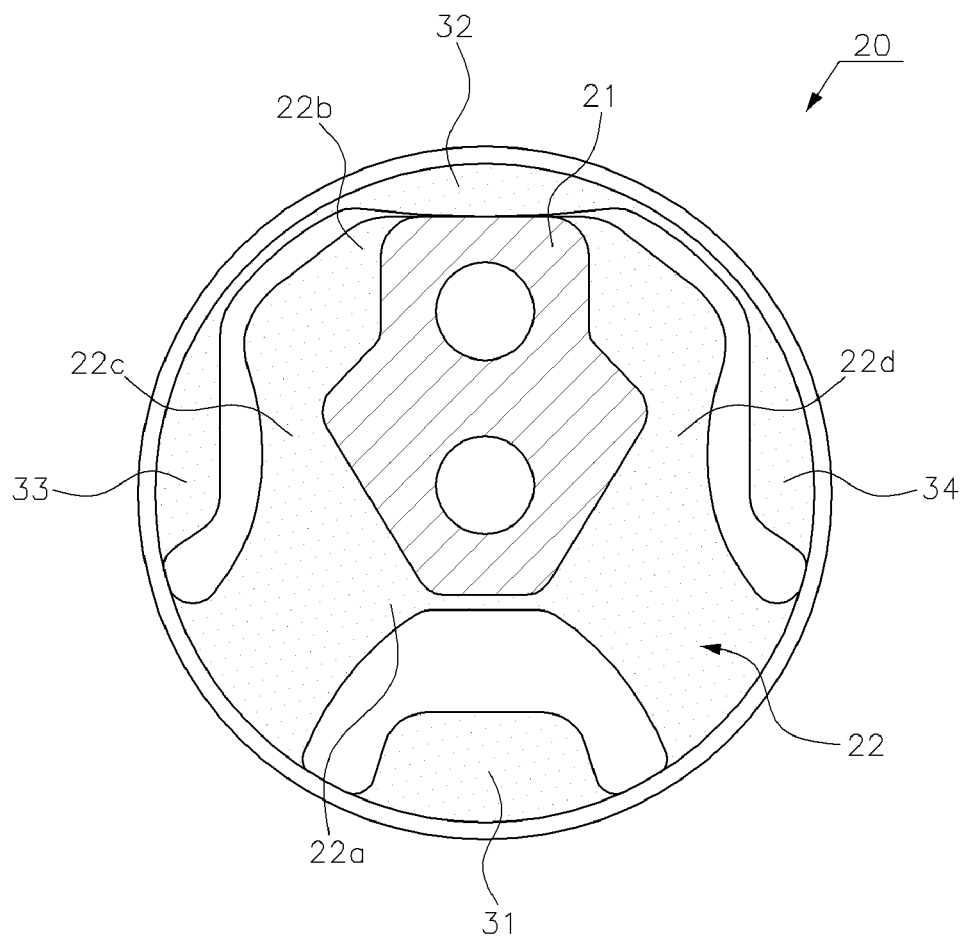
FIG. 2 is a cross-sectional view of the transmission mount in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Unless otherwise defined, the terminologies used in the specification of the present invention have the meanings that a person with ordinary skill in the Field of the Invention to which the present invention pertains typically understand, and in the following description and the accompanying drawings, a detailed description of publicly known functions and configurations will be omitted to avoid unnecessarily obscuring the subject matter of the present invention.

Figure 3A:
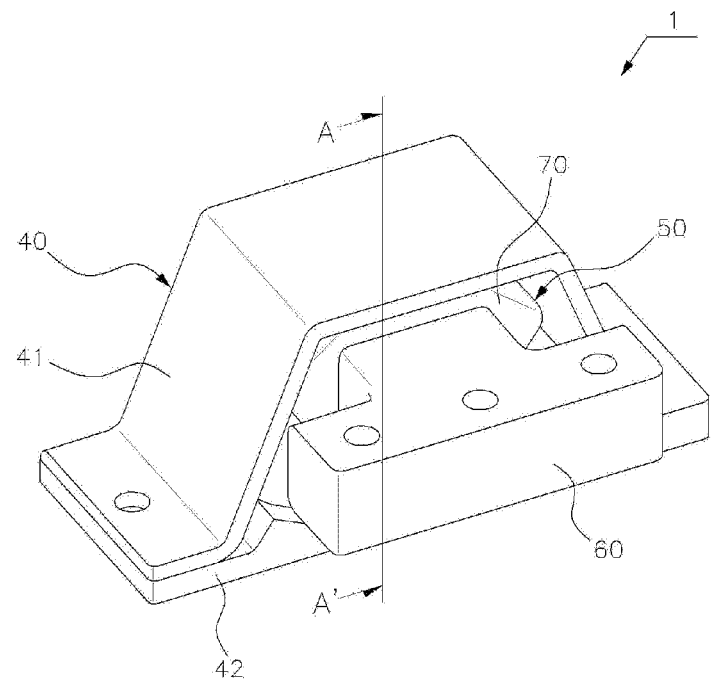
FIGS. 3A and 3B are perspective views of a transmission mount according to an exemplary embodiment of the present invention.
Figure 3B:
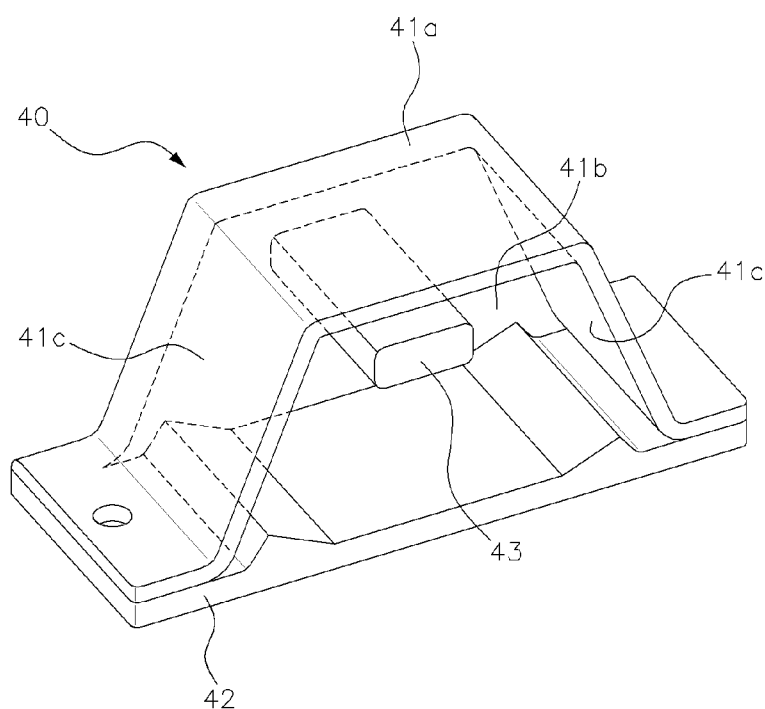

FIGS. 3A and 3B are perspective views of a transmission mount of the present invention.

A transmission mount 1 of the present invention is configured wherein an insulator 50, which includes an internal core 60 and an external core 70, is accommodated in a bracket 40.

The bracket 40 includes an upper housing 41 which covers an upper portion of the insulator 50, and a plate 42 which supports a lower portion of the insulator 50.

The transmission mount 1 of the present invention, which is configured as described above, has a structure that distributes stopping portions in respective directions applied to the mount.

With the stopping distribution structure, it is possible to distribute pressure loads of the stoppers caused by excessive movement of an engine which occurs when oscillation occurs, when a vehicle travels on a rough road, and when the vehicle is handled, and as a result, it is possible to control a movement of the vehicle and improve durability.

A detailed configuration of the transmission mount of the present invention, which is configured as described above, will be described.

Figure 4:
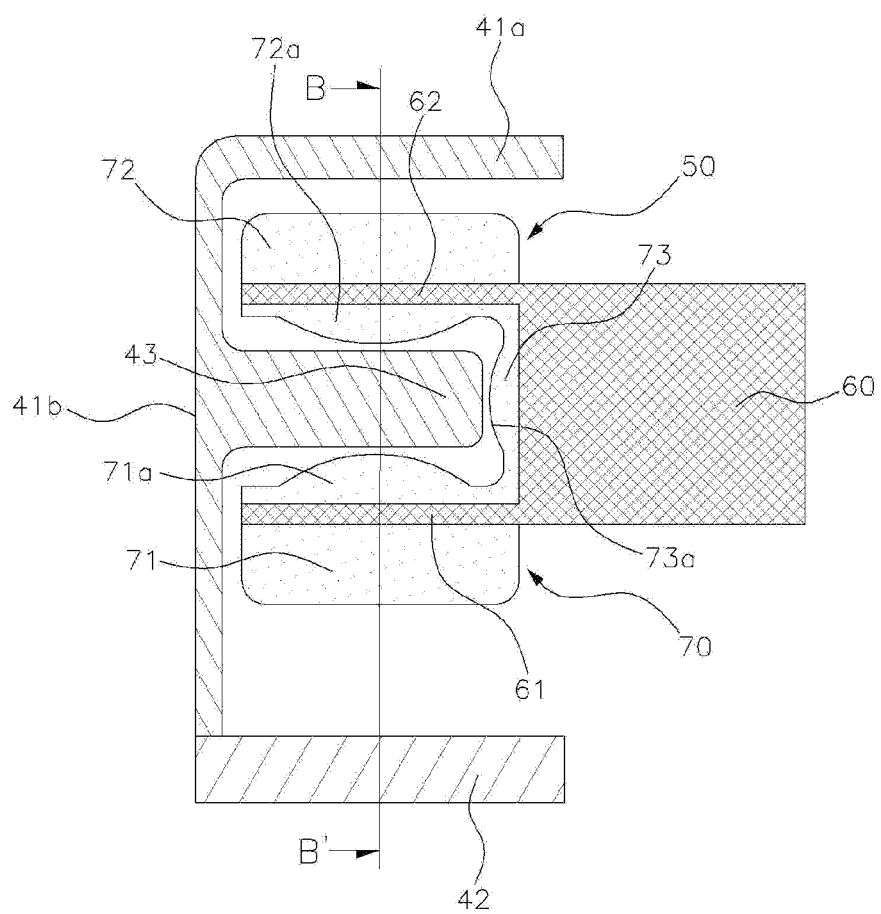
Figure 5:
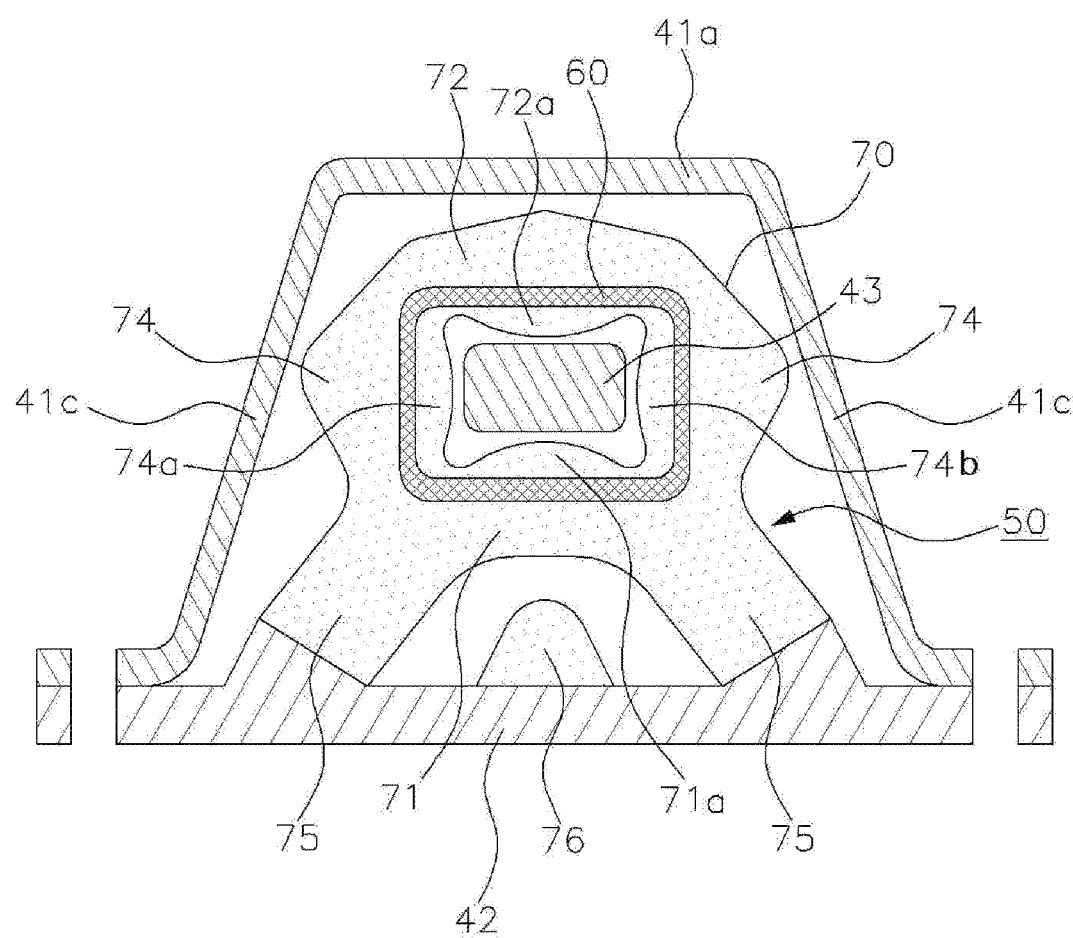

FIG. 4 and FIG. 5 are cross-sectional views of the transmission mount of the present invention, in which FIG. 4 is a cross-sectional view taken along line A-A' in FIG. 3A, and FIG. 5 is a cross-sectional view taken along line B-B' in FIG. 4.

First, referring to FIG. 3B and FIG. 4, the upper housing 41 of the transmission mount of the present invention has a trapezoidal shape having an upper surface 41a which covers the upper portion of the insulator 50, a rear surface 41b which covers a rear surface of the insulator 50, and lateral surfaces 41c which cover left and right surfaces of the insulator 50, respectively.

In the present case, a strut 43, which protrudes from the rear surface 41b in a direction perpendicular to the rear surface 41b, is formed on an intermediate portion of the rear surface 41b of the upper housing.

The strut 43 is a portion with which the stoppers having a distributed structure contact by vibration and the strut 43 may have a rectangular parallelepiped column shape.

The internal core 60 of the insulator 50 of the present invention is coupled to the external core 70 as a lower support 61 and an upper support 62 are disposed into the external core 70, and the internal core 60 includes a typical metallic material.

Next, referring to FIG. 5, the external core 70 of the insulator 50 of the present invention includes a lower portion 71 which defines a lower end portion based on the internal core 60 inserted into a body, an upper portion 72 which defines an upper end portion, both lateral portions 74 which define both lateral portions, both bridge portions 75 which support a body of the external core 70, and a lower main stopper 76 which protrudes upward from an upper surface of the plate 42 of the bracket 40, and the external core 70 includes a typical rubber material.

A space portion, which is pierced inward from the rear surface of the external core 70, is formed wherein the strut 43 may be inserted into a center of a body of the external core 70, and a distributed stopper structure is formed as internal wall surfaces of the space portion contact with an upper portion, a lower portion, and a front portion of the strut 43, respectively.

Therefore, to obtain the distributed stopper structure, a lower auxiliary stopper 71a is formed to protrude upward from an upper surface of the lower portion 71 of the external core 70, an upper auxiliary stopper 72a is formed to protrude gradually downward from a bottom surface of the upper portion 72 of the external core 70, lateral auxiliary stoppers 74a and 74b are formed to protrude gradually in a direction toward a center from internal walls of the lateral portions 74 of the external core 70, and an internal wall surface auxiliary stopper 73a is formed to protrude gradually toward an end surface of the strut 43 from an internal wall surface 73 of the space portion formed in the external core 70 which faces the end surface of the strut 43.

The auxiliary stoppers 71a, 72a, 73a, 74a, and 74b are configured to distribute respective stopping functions by assisting the main stopper that operates between the external core 70 and the upper housing 41.

Figure 6:
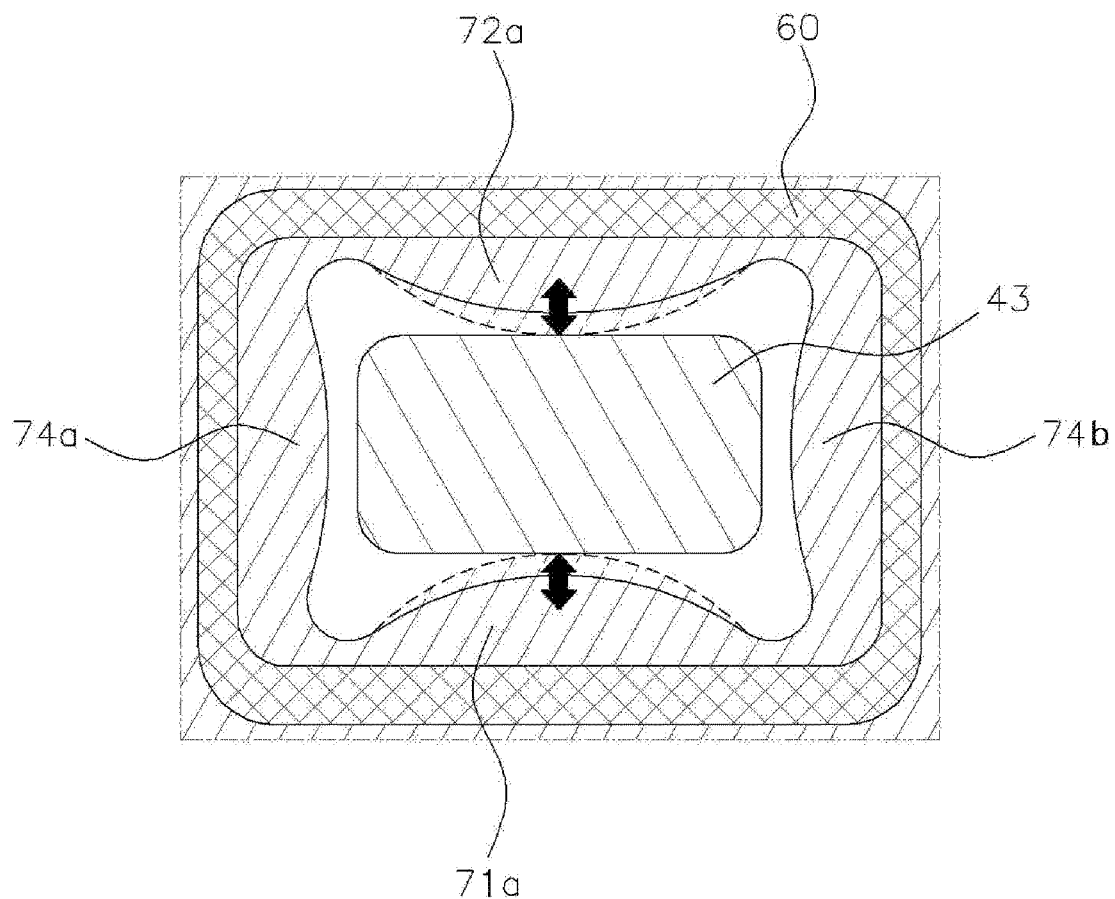
FIG. 6, FIG. 7, and FIG. 8 are views illustrating states in which the transmission mount according to an exemplary embodiment of the present invention operates.
Figure 7:
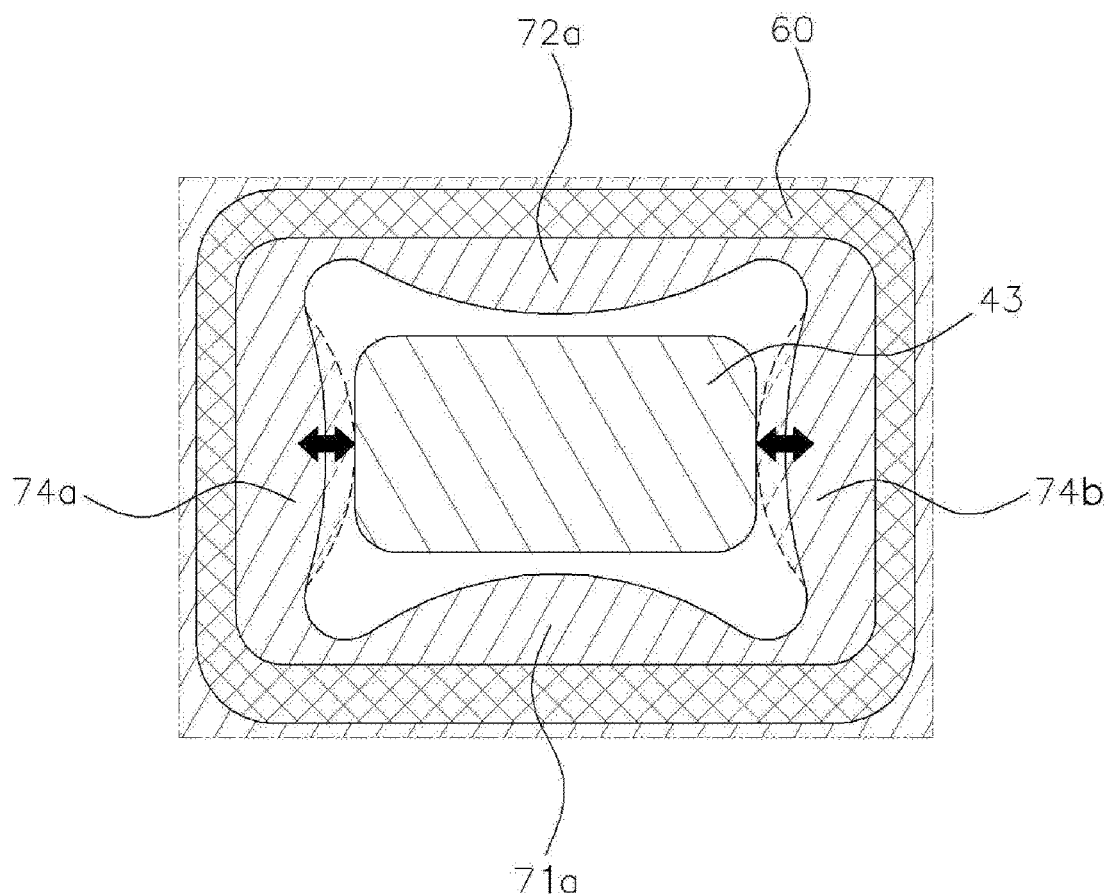
Figure 8:
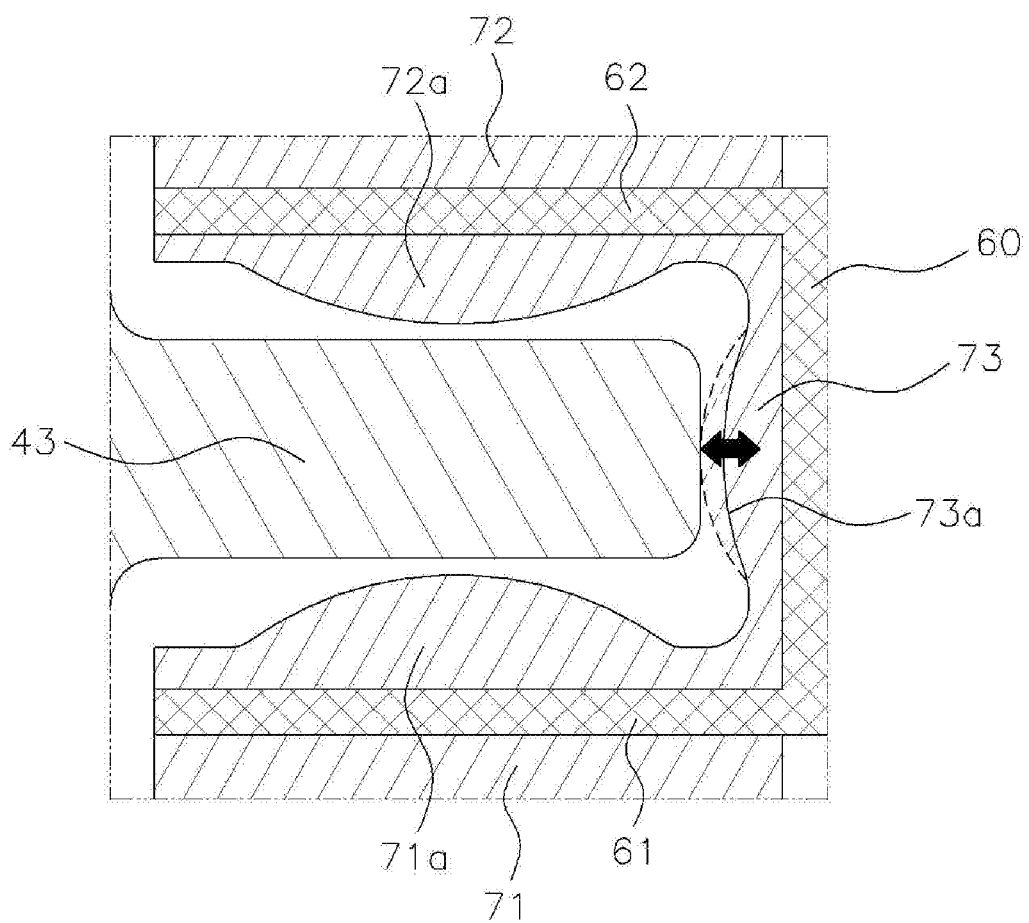

Hereinafter, an operation of the transmission mount of the present invention, which has the auxiliary stoppers, will be described. FIG. 6, FIG. 7, and FIG. 8 are views illustrating states in which the transmission mount of the present invention operates.

First, referring to FIG. 6, when vibration in the up and down directions is transmitted to the transmission mount of the present invention through the internal core 60, the lower portion 71 of the external core 70 contacts with the lower main stopper 76 formed on the upper surface of the plate 42, the upper portion 72 of the external core 70 contacts with the upper surface 41a of the upper housing 41, and as a result, the main stopper operates in the up and down directions.

Together with the operations of the main stopper in the up and down directions as described above, the lower auxiliary stopper 71a of the lower portion 71 of the external core 70 contacts with a bottom surface of the strut 43, and the upper auxiliary stopper 72a of the upper portion 72 of the external core 70 contacts with an upper surface of the strut 43, wherein the auxiliary stoppers are operated simultaneously in the up and down directions, and as a result, the distributed stoppers are operated together with the operation of the main stopper in the up and down directions.

Next, referring to FIG. 7, when vibration in the front and rear directions is transmitted to the transmission mount of the present invention through the internal core 60, the lateral portions 74 of the external core 70 contact with the lateral surfaces 41c of the upper housing 41, respectively, and as a result, the main stopper is configured to operate in the front and rear directions.

Together with the operation of the main stopper in the front and rear directions, the lateral auxiliary stoppers 74a and 74b of the lateral portion 74 of the external core 70 contact with both lateral surfaces of the strut 43, wherein the auxiliary stoppers are operated simultaneously in the front and rear directions, and as a result, the distributed stoppers are operated together with the operation of the main stopper in the front and rear directions.

Next, referring to FIG. 8, when vibration in the left and right directions is transmitted to the transmission mount of the present invention through the internal core 60, the lower portion 71, the upper portion 72, the lateral portions 74, and the bridge portions 75 of the external core 70 contact with the rear surface 41b of the upper housing 41, wherein the main stopper operates in the left and right directions.

Together with the operation of the main stopper in the left and right directions, the internal wall surface auxiliary stopper 73a, which is formed on the internal wall surface 73 of the space portion formed in the external core 70 which faces the end surface of the strut 43, contacts with the end surface of the strut 43, wherein the auxiliary stoppers are operated in the left and right directions.

According to the transmission mount of the present invention which is operated as described above, the auxiliary stopper as well as the main stopper are operated in the respective directions with respect to vibration transmitted in the up and down directions, the front and rear directions, and the left and right directions, wherein the distributed stoppers may be operated in the respective directions, and as a result, it is possible to further improve NVH performance of the vehicle, and to improve R&H performance of the vehicle.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission mount for a vehicle, comprising:
a bracket which accommodates an insulator having an external core coupled with an internal core, and includes an upper housing that covers an upper portion of the insulator, and a plate that supports a lower portion of the insulator; and
the external core which includes, based on the inserted internal core, a lower portion, an upper portion, both lateral portions, both bridge portions that support a body of the external core, and a lower main stopper formed on an upper surface of the plate,
wherein a space portion is formed in a body of the external core wherein a strut, which protrudes from a rear surface of an upper housing of the bracket, is configured to be inserted into the space portion, and internal wall surfaces of the space portion contact with an upper portion, a lower portion, and a front portion of the strut, respectively, and
wherein a lower auxiliary stopper is formed to protrude upward from an upper surface of the lower portion of the external core.

2. The transmission mount of claim 1, wherein the upper housing includes an upper surface which covers the upper portion of the insulator, a rear surface which covers a rear surface of the insulator, and lateral surfaces which cover left and right surfaces of the insulator, respectively.

3. The transmission mount of claim 1, wherein an upper auxiliary stopper is formed to protrude downward from a bottom surface of the upper portion of the external core.

4. The transmission mount of claim 1, wherein lateral auxiliary stoppers are formed in a direction toward a center from internal walls of the lateral portions of the external core.

5. The transmission mount of claim 1, wherein an internal wall surface auxiliary stopper is formed toward an end surface of the strut from an internal wall surface of the space portion formed in the external core which faces the end surface of the strut.

* * * * *